United States Patent Office 3,577,416
Patented May 4, 1971

3,577,416
PROCESS FOR THE SELECTIVE CHLORINA-
TION OF ALKYLMERCAPTO-SUBSTITUTED
s-TRIAZINES
Werner Schwarze, Frankfurt am Main, Günter Giessel-
mann, Neu-Isenburg, and Wolfgang Weigert, Offenbach
am Main, Germany, assignors to Deutsche Gold- und
Silber-Scheideanstalt vormals Roessler, Frankfurt am
Main, Germany
No Drawing. Filed Feb. 13, 1969, Ser. No. 799,099
Claims priority, application Germany, Feb. 17, 1968,
P 16 70 590.1
Int. Cl. C07d 55/48
U.S. Cl. 260—248                                    18 Claims

ABSTRACT OF THE DISCLOSURE s-Triazines which are 2 or 2,4 or 2,4,6 substituted by alkylmercapto groups and wherein the balance of said 2,4,6 substituents is substituted by chlorine, if any, are selectively chlorinated by subjecting the triazines to the action of a chlorinating agent, the amount of chlorinating agent in said reaction being selected to provide for at least two chlorine atoms for each alkylmercapto group to be converted, whereby a predetermined number of said alkylmercapto groups may be converted to chlorine. The products of the reaction are valuable for making herbicides, optical brighteners, light stabilizers, and other compounds and are useful also as stabilizers for polyformaldehyde and as starting products for making stabilizers for the rubber industry.

BACKGROUND OF THE INVENTION 2-methylmercapto-4,6-dichloro-s-triazine has been made by reacting cyanuric chloride with methylmercaptan in the presence of 2,6-dimethylpyridine, 2,4,5-trimethyl pyridine or 2-methylquinoline. A by-product in this reaction in the amount of 2–3% is 2,4 - bis-methylmercapto-6-chlorotriazine. This reaction has also been carried out in the presence of other organic bases or in the presence of alkali compounds which function as HCl-acceptors. The by-product in this case is formed in amounts up to 30%. In addition there are obtained about 3 to 5% of tris-methylmercaptotriazine.

However, no process has been known heretofore, so far as applicants are aware, which permits converting the listed by-products in a simple manner either into the original compounds or into the desired final product.

Substituted alkylmercaptotriazines are useful for pest control, in particular as herbicides. Particularly significant have been the 2,4 - bis-amino-6-methylmercaptotriazines. They can easily be formed by reacting the 2-methylmercapto-4,6-dichlorotriazine with the corresponding amines.

For instance, 2-methylmercapto-4,6-dichloro-s-triazine can be reacted as appears from the following equation. The reaction proceeds in two stages and in both stages compounds result which are useful as herbicides:

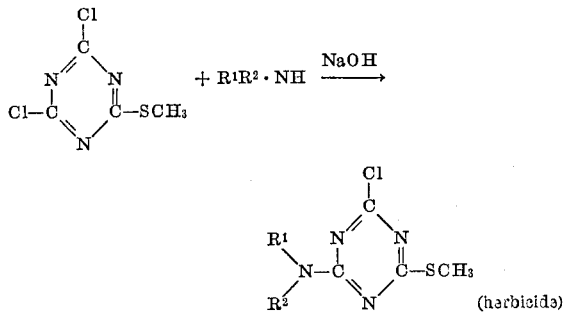

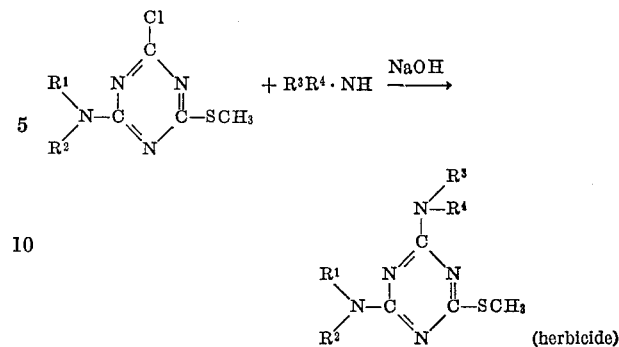

$R^1$, $R^3$=H or alkyl;
$R^2$, $R^4$=alkyl having 1 to 4 C atoms.

The 2,4,6-trichloro-s-triazine, that is cyanuric chloride, is valuable as starting product for making a large number of compounds which have a broad range of usefulness in modern chemistry. For instance, herbicides of the atrazine or simazine type may be obtained in the reaction with primary amines. In similar maner, it is also possible to obtain optical brighteners and light stabilizers.

The 2,4-bis-methylmercapto-6-chloro-s-triazine has also usefulness as stabilizer for polyformaldehyde.

Those compositions in which the alkylmercapto-group or groups have up to 12 carbon atoms are useful as starting products for the making of stabilizers for the rubber industry which have the general formula as follows:

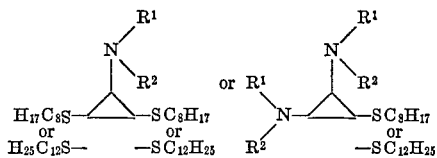

The present invention therefore has the object to provide for a simple process whereby one or more of the alkyl mercapto groups in the 2 or 2,4 or 2,4,6 position of s-triazines in which the remaining substituents are chlorine can be chlorinated in a selective manner so as to obtain a predetermined number of chlorine converted methylmercapto groups.

SUMMARY OF THE INVENTION

This object is met by subjecting the 2 or 2,4 or 2,4,6 alkylmercapto-substituted s-triazines to the action of a chlorinating agent, the amount of chlorinating agent in said reaction being selected to provide for at least 2 chlorine atoms for each alkylmercapto group to be converted whereby a predetermined number of said alkylmercapto groups may be converted to chlorine. s-Triazines may thus be obtained wherein one or two or all three methylmercapto groups have been replaced by chlorine.

DESCRIPTION OF THE PREFERRED EMBODIMENTS

The reaction of the invention can be carried out at normal pressure. However, preferably a reduced pressure is employed. This will permit, for instance, to remove the sulfene chloride, such as $CH_3SCl$, immediately from the reaction medium as it is being formed during the reaction without permitting a further chlorination of the alkyl group to take place. The preferred vacuum is between 400 and 30 mm. mercury. The high vacuum, however, is not immediately attainable because of the prevailing vapor pressure. It is therefore preferable to initiate the reaction with a pressure of about 400 mm. mercury, which then will improve during the course of the reaction to a vacuum of about 30 mm. mercury.

The reaction is preferably carried out in the presence of a catalyst. This will facilitate the control of the composition of the final product by selectively limiting the chlorination. The use of a catalyst also results in an increase of the yield and dispenses with the necessity of using an excess of chlorinating agent.

Catalysts for the reaction of the invention may be any Lewis-acid, particularly boron trifluoride. The preferred catalyst is $FeCl_3$. The second preference is $AlCl_3$. Another useful catalyst is $SnCl_4$.

The catalysts are employed in amounts between 0.2 and about 2.0% relative to the initial amount of the alkylmercapto triazine that is to be converted.

The speed of the reaction can be varied by changing the reaction temperature. The reaction can be carried out both at room temperature and at an elevated or even depressed temperature. The temperature, for instance, may vary between about $-30°$ C. and the boiling point of the particular alkylmercapto triazine employed as starting product.

The number of substituents may vary as indicated. In these substituents the number of carbon atoms may be between 1 and 12. The process of the invention has preferred application for the methyl- and ethylmercapto-substituted compounds.

The preferred chlorinating agent is sulfuryl chloride. Other useful chlorinating agents are phosphor pentachloride, antimony pentachloride and disulfur dichloride as well as sulfur dichloride.

The reaction may be carried out either with the starting products being in dry condition or in molten condition or as a solution.

Another valuable chlorinating agent is chlorine as such. In using chlorine or in using any of the mentioned chlorinating agents, alkylsulfenyl chlorides are formed during the reaction which form solvents for the reaction. These alkylsulfenyl chlorides may be removed continuously from the reaction mixture and recovered for further use, or they can be reacted with excess chlorine to form the corresponding trichloroalkylsulfenyl chlorides. These latter compounds in turn are valuable intermediates for further synthetic processes. For instance, trichloroalkylsulfenyl chloride ($CCl_3 \cdot SCl$) is a starting product for well-known fungicides such as "Captan" of the formula

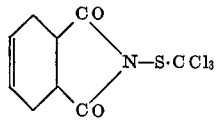

If sulfuryl chloride is used as the chlorinating agent $SO_2$ will form which upon evaporation will absorb some of the heat of the exothermic reaction. This makes it easier to control the temperature inasmuch as the amount of sulfuryl chloride can be adjusted so that the $SO_2$ which forms during the reaction will exactly compensate the generated amount of heat. The sulfur dioxide can be recovered quantitatively or it can be recovered by reaction with chlorine to sulfuryl chloride.

As indicated, it is possible to carry out the reaction with the starting products in solution. This is particularly advisable when chlorine is employed as chlorinating agent.

Various solvents can be used. They must however be so selected as to be inert under the conditions of the reaction towards chlorine. Examples of suitable solvents are carbon tetrachloride, sulfur dioxide, trichlorobenzene, tetrachloroethane, hexachlorobutadiene and hexachloroethane.

If the reaction of the invention results in mixtures they can be separated in conventional manner, for instance by recrystallization and/or distillation.

The following examples will illustrate the invention. In these examples, the following terminology has been employed:

MDT=2-methylmercapto-4,6-dichloro-s-triazine
BMT=2,4-bismethylmercapto-6-chloro-s-triazine
TMT=2,4,6-trismethylmercapto-s-triazine.

EXAMPLE 1

207.5 g. of BMT were heated to 120° C. Chlorine was then passed through the fused product upon stirring. After six hours no further chlorine was taken up. From the bright red solution there were crystallized upon standing 141.5 g. cyanuric chloride (M.P. 145–146° C.) corresponding to 76.7% of the theoretical value. The remaining golden-yellow liquid was subjected to distillation in a vacuum. In a preliminary run, 23.5 g. of substance was obtained. After that, there were obtained by distillation 291.4 g. of trichloromethane-sulfenyl chloride corresponding to 78.3% of the theoretical value.

Further, 18.5 g. (corresponding to 10% of the theoretical value) of impure cyanuric chloride was isolated from the distillation residue.

EXAMPLE 2

21 g. of 2-ethylmercapto-4,6-dichlorotriazine was dissolved in 300 ml. carbon tetrachloride and chlorine was then passed into the solution. The temperature increased to 40° C. After one hour, the introduction of chlorine was discontinued and the further processing was undertaken as in Example 1. In this case it was possible to obtain 16.4 g. cyanuric chloride from the residue.

EXAMPLE 3

Four different specimens were prepared by placing 20.75 g. each of 2,4-bis-methylmercapto-6-chlorotriazine in 200 ml. carbon tetrachloride. These specimens were then treated with a solution of chlorine in carbon tetrachloride at a temperature of 20° C. The chlorine in this case was employed in a varying excess over and above the theoretical amount of 1 mole chlorine per mole triazine, as appears further from the table below. After one hour, the different specimens received the final processing and the residue was evaluated by a gas chromatographic process. The results appear from the table.

| Test Number: | Cl= excess (percent) | Cyanurchloride (percent) | MDT | BMT | Total reaction product | Yield of MDT [1] |
|---|---|---|---|---|---|---|
| 1 | 5 | 8.6 | 47.8 | 43.6 | 56.4 | 86.2 |
| 2 | 25 | 12.1 | 54.0 | 33.9 | 66.1 | 87.7 |
| 3 | 50 | 14.5 | 57.0 | 26.0 | 74.0 | 77.0 |
| 4 | 100 | 19.1 | 66.3 | 7.1 | 92.9 | 71.3 |

[1] Relative to total reaction product, percent.

EXAMPLE 4

200 g. of a distillation residue was dissolved in one liter of 1,2,4-trichlorobenzene. The residue had the following composition:

|  | Percent |
|---|---|
| TMT | 10.7 |
| BMT | 89.3 |
| MDT | 59.4 |

Chlorine was then passed through the solution at room temperature (20–25° C.) and reduced pressure (30 to 200 mm., preferably about 40 mm. mercury) while the solution was subjected to stirring. After a reaction time of 30, 60 and 240 minutes, different analyses of the reaction product were carried out with the following results:

after 30 minutes:

|  | Percent |
|---|---|
| TMT | 0 |
| BMT | 34.0 |
| MDT | 59.4 | after 60 minutes:

|  | Percent |
|---|---|
| BMT | 15.1 |
| MDT | 83.0 |
| Cyanuric chloride | 1.9 | after 240 minutes:

|  | Percent |
|---|---|
| TMT | 0 |
| BMT | 0 |
| MDT | 58.5 |
| Cyanuric chloride | 41.5 |

EXAMPLE 5

1610 g. of a 97% sulfuryl chloride (11.6 mole corresponding to the theoretical amount plus a 6% excess) was added 2100 g. of a finely pulverized distillation residue. The residue was of the type obtained in making 2-methylmercapto-4,6-bis-chloro-s-triazine (MDT). More specifically, it consisted of 1909 g. (9.2 mole) 2,4-bis-methylmercapto-6-chloro-s-triazine (BMT) and 191 g. (0.87 mole) 2,4,6-tris-methylmercapto-s-triazine (TMT). The addition of the sulfuryl chloride was carried out at room temperature (24° C.) during a time of a few minutes. A reaction occurred almost instantaneously. During the reaction, a solution of the mixture was formed in a few minutes. The temperature went down to 14° C. since the sulfur dioxide which formed during the reaction took up heat because of evaporation. After all of the sulfuric chloride had been added, the reaction was permitted to proceed for another 10 minutes and the highly volatile components were then removed by distillation. By means of fractional condensation, the theoretical amount of sulfur dioxide was recovered. There remained a distillation residue amounting to 1975 g. of a mixture of the following composition, which was determined by gas chromatography:

|  | Percent |
|---|---|
| Cyanuric chloride | 3.6 |
| MDT | 87.5 |
| BMT | 8.6 |

Relative to the input of BMT and TMT, the total reaction product amounted to 91.2% and the yield of MDT relative to the total reaction product was 96.0%.

EXAMPLE 6

The same steps were carried out as in Example 5, but no excess of sulfuryl chloride, only the theoretical amount, was employed and a catalyst was added. In each of several runs there were used 38.4 g. of the same distillation residue as in Example 5. The final preparation of the product was effected in all cases after 15 minutes. The amounts employed and the results appear in the following table:

| Test Number: | $SO_2Cl_2$, grams | Amount of catalyst | Cyanuric chloride | MDT | BMT | Total reaction product | Yield of MDT [2] |
|---|---|---|---|---|---|---|---|
| 1 | [3] 27 | Without catalyst | 4.3 | 79.0 | 15.9 | 83.3 | 94.7 |
| 2 | [3] 27 | 0.2 $FeCl_3$ | 2.4 | 87.3 | 9.3 | 89.7 | 97.5 |
| 3 | [3] 27 | 2.0 $FeCl_3$ | 2.2 | 95.5 | 2.3 | 97.7 | 97.8 |
| 4 | 30 (10% excess) | 2.0 $FeCl_3$ | 2.7 | 96.2 | 1.1 | 98.9 | 97.3 |
| 5 | [3] 27 | 1.0 $AlCl_3$ | 2.5 | 86.7 | 9.5 | 89.2 | 97.0 |

[1] Relative to initial distillation residue.
[2] Relative to total reaction product, percent.
[3] Theoretical amount.

EXAMPLE 7

21.2 g. of BMT (98% concentration; 0.1 mole) was treated for 4½ hours at room temperature and subsequently for 1 hour at 60° C. with 15 g. (0.11 mole) disulfur dichloride.

After distilling off the excess sulfur dichloride a residue was obtained containing 3% MDT, 10% cyanuric chloride and 87% of nonreactive BMT.

EXAMPLE 8

21.2 g. BMT (98%; 0.1 mole) was treated for 1 hour at 60° C. with 11.3 g. (0.11 mole) of sulfur dichloride. After distilling off the highly volatile reaction products, there was obtained a mixture consisting of 32% MDT, 7.2% cyanuric chloride and 60.8% of nonreacted BMT.

EXAMPLE 9

21.2 g. (0.1 mole) of BMT (98%) was heated for 5 hours with 22.9 g. (0.11 mole) of phosphorus pentachloride to a temperature of 100° C. After separation of the highly volatile reaction products there remained a residue consisting of 39.2% MDT, 7.7% cyanuric chloride and 53.1% nonreacted BMT.

EXAMPLE 10

29.4 g. of 2-octylmercapto-4,6-bis-chloro-s-triazine (00.1 mole) was treated for 4 hours at room temperature with 15 g. (0.11 mole) of sulfuryl chloride. After fractional distillation reaction, products were obtained containing 14.7 g. cyanuric chloride corresponding to a yield of 80.0%.

EXAMPLE 11

35 g. of 2-dodecylmercapto-4,6-bis-chloro-s-triazine (0.1 mole) was treated for 4 hours at room temperature with 15 g. (0.11 mole) of sulfuryl chloride. After fractional distillation of the reaction products, there were obtained 14 g. of cyanuric chloride corresponding to the yield of 76.0%.

We claim:

1. A process for the selective chlorination of s-triazines wherein the 2 or 2,4 or 2,4,6 positions are substituted by alkylmercapto groups of between 1 and 12 carbon atoms in the alkyl group, the balance of said 2,4,6 substituents, if any, being substituted by chlorine, the said process comprising subjecting the said substituted s-triazines to the action of a chlorinating agent, the amount of chlorinating agent in said reaction being selected to provide for at least 2 chlorine atoms for each alkylmercapto group to be converted whereby a predetermined number of said mercapto groups may be converted to chlorine.

2. The process of claim 1, wherein the alkyl group of the alkylmercapto substituent is methyl or ethyl.

3. The process of claim 1, wherein the chlorinating agent is selected from the group consisting of chlorine, sulfuryl chloride, phosphorus pentachloride, antimony pentachloride, disulfur dichloride and sulfur dichloride.

4. The process of claim 1, wherein the chlorination is carried out at a temperature between about −30° C. and the boiling point of the alkylmercapto s-triazine.

5. The process of claim 1, wherein the chlorination is carried out at subatmospheric pressure.

6. The process of claim 5, wherein the reaction is carried out in a vacuum that increases from an initial 400 mm. mercury to 30 mm. mercury during the course of the reaction.

7. The process of claim 1, wherein the chlorination is carried out in the presence of a catalyst.

8. The process of claim 7, wherein the catalyst is present in amounts from about 0.2 to 2% of the weight of said alkylmercapto s-triazine.

9. The process of claim 7, wherein the said catalyst is a Lewis-acid.

10. The process of claim 9, wherein the catalyst is boron trifluoride.

11. The process of claim 7, wherein the catalyst is $FeCl_3$ or $AlCl_3$ or $SnCl_4$.

12. The process of claim 1, wherein the chlorination is carried out while the starting product is dissolved in a solvent that is inert to the chlorinating agent.

13. The process of claim 12, wherein the solvent is carbon tetrachloride, sulfur dioxide, trichlorobenzene or tetrachloroethane.

14. The process of claim 1 wherein the alkyl-sulfenyl chloride formed in the course of the reaction is recovered for further use.

15. The process of claim 14, wherein the alkyl-sulfenyl chloride is recirculated into the reaction.

16. The process of claim 1, wherein the chlorinating agent is sulfuryl chloride and is employed in an amount, giving consideration also to the number of alkylmercapto groups to be converted, to obtain an amount of sulfur dioxide during the reaction that compensates for the heat produced in the reaction.

17. The process of claim 1, wherein the chlorinating agent is sulfuryl chloride and the sulfur dioxide formed during the reaction is recovered.

18. The process of claim 17, wherein the sulfur dioxide recovered is reacted with chlorine to form sulfuryl chloride for further use in the reaction.

References Cited

UNITED STATES PATENTS 3,073,823    1/1963    Merkel et al. _____ 260—248

JOHN M. FORD, Primary Examiner

U.S. Cl. X.R.

71—93; 260—249.8, 249.5